United States Patent
Rink

[11] Patent Number: 5,842,265
[45] Date of Patent: Dec. 1, 1998

[54] PROCESS FOR PRODUCING BONDED PLASTIC METAL PARTS

[75] Inventor: Manfred Rink, Köln, Germany

[73] Assignee: Bayer Aktiengesellschaft, Germany

[21] Appl. No.: 583,184

[22] Filed: Jan. 4, 1996

[30] Foreign Application Priority Data

Jan. 13, 1995 [DE] Germany .................. 195 00 790.5

[51] Int. Cl.[6] .................................................. B23P 19/04
[52] U.S. Cl. ........................ 29/460; 29/527.4; 264/255; 425/127; 425/129.1
[58] Field of Search ................... 29/460, 527.4; 264/255, 294; 425/116, 127, 129.1, 542

[56] References Cited

U.S. PATENT DOCUMENTS

| | | |
|---|---|---|
| 2,821,764 | 2/1958 | Leahy et al. . |
| 3,551,956 | 1/1971 | Rosier ................................ 425/129.1 |
| 4,306,511 | 12/1981 | Ashby et al. . |
| 4,611,381 | 9/1986 | LaBarge et al. . |
| 4,860,425 | 8/1989 | Kunisaki et al. . |
| 4,956,139 | 9/1990 | Koizumi et al. . |
| 4,965,933 | 10/1990 | Mraz et al. .......................... 29/527.4 |
| 5,359,761 | 11/1994 | Whitson ............................ 425/129.1 |
| 5,448,824 | 9/1995 | Groves et al. ....................... 29/527.4 |

FOREIGN PATENT DOCUMENTS 0 592 768 A1  4/1994  European Pat. Off. .

*Primary Examiner*—P. W. Echols
*Attorney, Agent, or Firm*—Connolly & Hutz

[57] ABSTRACT

The invention relates to a process and a device for the production of bonded plastic/metal parts in the cavity of a modified injection-moulding tool by a combination of metal-joining techniques and conventional injection-moulding processes.

4 Claims, 2 Drawing Sheets

*Pins Fixing Metal Sheets In Position During Injection Moulding.*

PROCESS FOR PRODUCING BONDED PLASTIC METAL PARTS

The present invention relates to a process and a device for producing bonded plastic/metal parts in the cavity of a modified injection mould by a combination of metal-joining techniques and conventional injection-moulding processes.

In conventional techniques for producing bonded plastic/metal parts, hereinafter referred to as hybrid structures, the normal procedure particularly for the production of parts having large surface areas (such as for example car door frames) is to join deep-drawn, one-piece blanked metal sheets by injection-moulding or adhesive bonding using a thermoplastic material. This method has the disadvantage that a comparatively large quantity of sheet metal waste is produced, particularly in the case of blanked frame parts, which has to be reprocessed. One possibility of avoiding this problem is to assemble such sheet metal frame parts from rivetted or welded individual metal sheets, onto which plastic is then injection-moulded.

The joining or welding of sheet metal parts is disclosed for example in DE 3,916,817 A1, DE 3,710,929 and DE 3,701,895.

The injection-moulding of plastic onto sheet metal parts is also well-known. DE 3,611,224 C2 and DE 3,839,855 A1, which disclose corresponding bonded parts, can for example be mentioned in this connection.

It has however been found to be disadvantageous to combine the known joining or rivetting processes with injection-moulding, since joining requires complicated additional machines, particularly when the abovementioned methods are used, as compared for example to a blanking machine for an uncomplicated sheet metal frame. In addition, the allowed variations in the dimensional accuracy of the joined sheet metal parts are comparatively minimal, particularly when the parts are subsequently placed in the injection-moulding tool. The object was to find a process which allows individual metal sheets to be used for the production of bonded plastic/metal parts, in particular frame sections, in a simple and above all economically advantageous manner, and which does not have the above disadvantages and in particular provides a firm frictional bond between the individual metal sheets.

This object is achieved according to the invention by a process for producing bonded plastic/metal parts in the cavity of a modified injection-moulding tool using a combination of metal-joining techniques and conventional injection-moulding processes, which is characterised in that in the first step the individual metal sheets or shaped metal sheets to be joined are placed in the injection-moulding tool and are interlockingly fixed to each other by moulding or joining with the aid of a press die and are then bonded to each other and to a plastic section formed by injection-moulding a plastic material into openings in the region of the joining or pressing point and/or into other superimposed openings in the individual metal sheets. By inserting and joining the individual metal sheets in the injection-moulding tool it is no longer necessary to carry out, in a separate working step, the complicated prefabrication procedure which forms a part of conventional rivetting or joining processes and is subject to tolerance requirements. It is therefore possible to dispense with the corresponding complicated joining machines. The sheet metal parts are laterally fixed by pressing the parts together. The zones formed in the region of the openings by the injection-moulding process fix the metal sheets to one another and simultaneously support and hold the plastic section of the bonded part. By using a small number of individual metal sheets the quantity of waste sheet metal is drastically reduced compared with conventional metal sheets, such as for example those used for frames, which are blanked from materials having large surface areas.

The process according to the invention can be carried out using all well-known thermoplastic materials or mixtures, in particular polycarbonate, polyamide, polyesters, ABS or polypropylene. In order to improve the adhesion not only between the individual metal sheets but also to the plastic the metal sheets can be pretreated in a manner known per se, for example with a layer for promoting adhesion or with a bonding agent.

The dimensional accuracy of the individual sheets joined to each other can be increased by fixing the metal sheets in position before or during the joining/pressing process and/or the injection-moulding process in the region of specific openings by means of pins arranged inside the mould of the injection-moulding tool.

The invention also relates to a device for carrying out the process according to the invention, which is characterised in that one or more joining or pressing dies, optionally together with the corresponding lower dies, are arranged in the cavity of an injection-moulding tool in those zones in which the individual metal sheets are to be attached to one another by joining, which dies can be retracted from the cavity of the injection-moulding tool in order to inject thermoplastic materials into the mould and in particular into the joint zones/openings in the metal sheets.

Individual metal sheets which are suitable for carrying out the process according to the invention are metal sheets composed for example of steel or aluminium and in particular having a thickness of 0.5 to 0.9 mm.

The invention is illustrated in more detail in the following with the aid of the figures.

EXAMPLE

Figure 1:
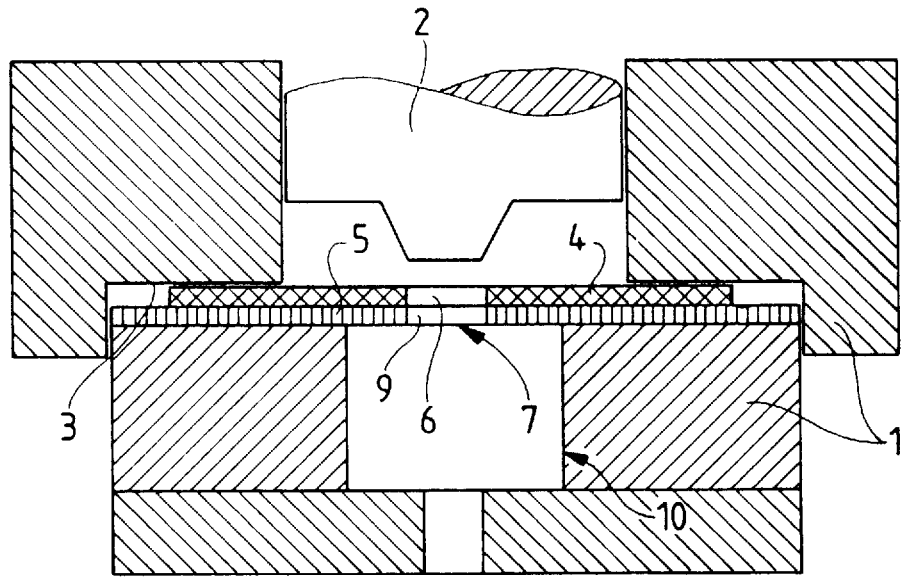
FIG. 1 shows the layout of a device according to the invention containing inserted individual metal sheets.
Figure 2:
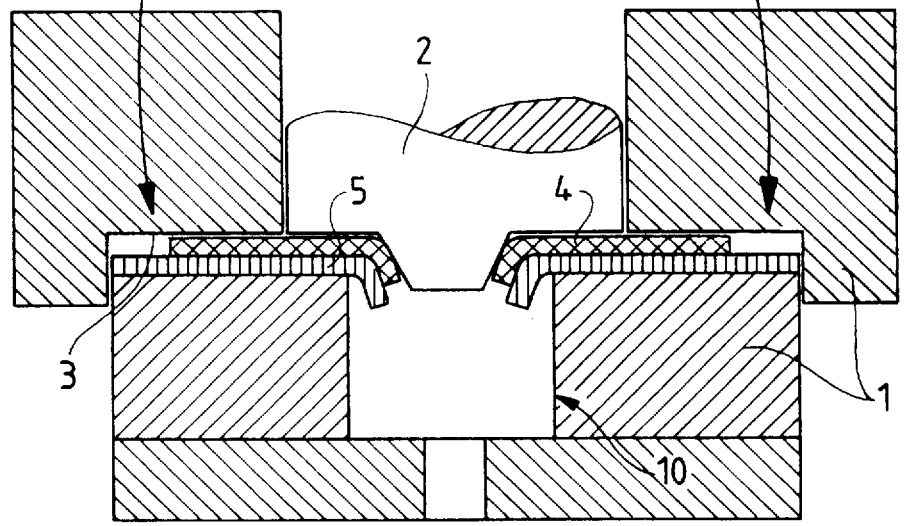
FIG. 2 shows the lateral attachment of the individual metal sheets to one another by joining.
Figure 3:
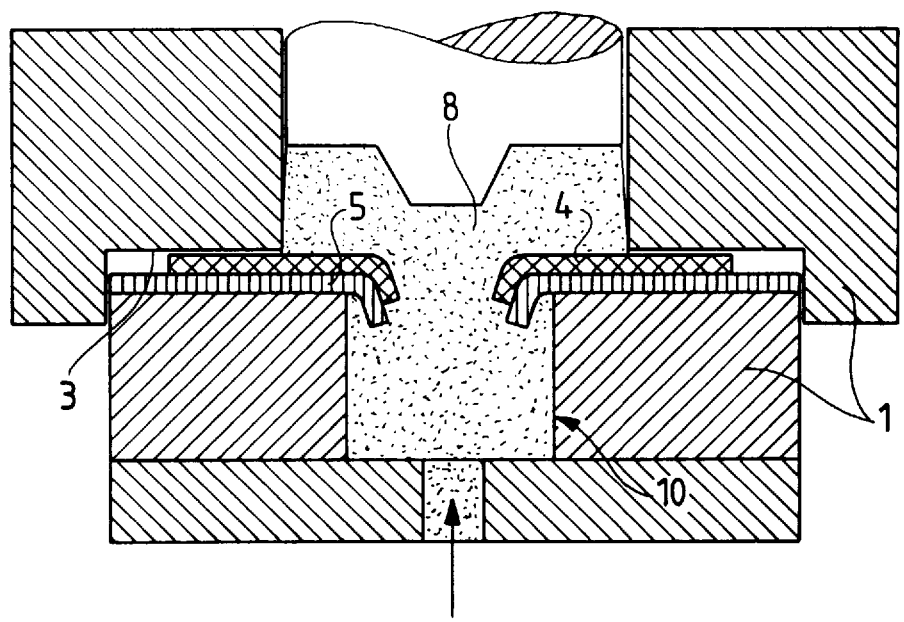
FIG. 3 shows the filled injection mould in which the joining die has been retracted.

A conventional injection mould 1 was modified in such a manner that "clinching" or joining dies 2 are inserted in the wall 3 of the injection-moulding tool. The individual metal sheets 4,5 are inserted into the injection mould 1 in such a manner that the openings 6, 9 in metal sheets 4 and 5 rest on top of each other and are arranged in the region of the joining zones 7 (see FIG. 1). As shown in FIG. 2, the upper die 2 is pressed onto the openings 6, 9 in the metal sheets and the metal sheets 4 and 5 are pressed against each other. The upper die 2 is retracted and the injection mould is then filled with a thermoplastic material 8, which surrounds the joining zone 7 and fills the cavity 10 (see FIG. 3). Pins may be arranged on the inside of the mould 1 to ensure proper dimensional placement of the metal sheets.

A firm bond is formed between the individual sheets which can also simultaneously serve as a supporting zone for the bond between the metal sheet and the plastic part.

I claim:

1. A process for producing bonded plastic/metal parts by a combination of joining by pressing at least two individual metal sheets and injection-moulding a thermoplastic material comprising the steps of inserting the individual metal sheets to be joined into an injection-moulding tool and interlockingly fixing the sheets to one another by pressing, and bonding the metal sheets to one another by injection-moulding a thermoplastic material into openings in the sheets.

2. A process according to claim 1, wherein the individual metal sheets are fixed in position in the mould of the injection-moulding tool during the injection-moulding process by means of pins.

3. A process according to claim 1, wherein the thermoplastic material is selected from the group consisting of polycarbonate, polyamide, polyester, polystyrene, ABS, polybutylene terephthalate and polypropylene.

4. A process according to claim 1, including the step of pretreating the sheets with an adhesive promoter or bonding agent before injection-moulding a plastic material onto the metal sheets.

* * * * *